(12) United States Patent
Wu

(10) Patent No.: US 6,321,006 B2
(45) Date of Patent: Nov. 20, 2001

(54) OPTICAL FIBER HAVING AN EXPANDED MODE FIELD DIAMETER AND METHOD OF EXPANDING THE MODE FIELD DIAMETER OF AN OPTICAL FIBER

(75) Inventor: Qi Wu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/840,607

(22) Filed: Apr. 24, 2001

Related U.S. Application Data

(63) Continuation of application No. 09/398,173, filed on Sep. 17, 1999, now Pat. No. 6,275,627.
(60) Provisional application No. 60/101,888, filed on Sep. 25, 1998.

(51) Int. Cl.[7] .............................. G02B 6/26; G02B 6/42
(52) U.S. Cl. ............................................. 385/28; 385/123
(58) Field of Search .................................. 385/28, 27, 123

(56) References Cited

U.S. PATENT DOCUMENTS

| 5,524,156 | * | 6/1996 | Van Der Tol | 385/43 |
| 5,818,987 | * | 10/1998 | Bakhti et al. | 385/28 |
| 6,115,519 | * | 9/2000 | Espindola et al. | 385/43 |

\* cited by examiner

*Primary Examiner*—Scott J. Sugarman
(74) *Attorney, Agent, or Firm*—Eric M. Smith

(57) ABSTRACT

The present invention is directed to a generally small mode field diameter ("MFD") optical fiber having a core bounded by a cladding, a cleaved end, and an expanded mode field diameter. The expanded mode field diameter is formed by thermally diffusing one or more dopants in the core of the small mode field diameter optical fiber using a highly localized heat source. The resulting adiabatic taper has an expanded mode field diameter that is optimized for connection to another optical fiber having a larger mode field diameter. The adiabatic taper is formed in the smaller mode field diameter optical fiber by aligning and abutting the cleaved ends of two fibers having different mode field diameter's to form a splice seam. The splice seam is offset a predetermined distance from the center of the region heated by a heat source to splice the fibers and expand the mode field diameters. As the mode field diameters expand, the splice loss across the splice is monitored. When the splice loss is at or sufficiently close to a target loss, heating is terminated, and the spliced optical fiber is cleaved where the mode field diameter of the smaller mode field diameter fiber portion of the spliced optical fiber is optically expanded to match the mode field diameter of another optical fiber.

18 Claims, 5 Drawing Sheets

OPTICAL FIBER HAVING AN EXPANDED MODE FIELD DIAMETER AND METHOD OF EXPANDING THE MODE FIELD DIAMETER OF AN OPTICAL FIBER

This application is a continuation of U.S. application Ser. No. 09/398,173, filed on Sep. 17, 1999 now U.S. Pat. No. 6,275,627, which claims the benefit of U.S. Provisional Application No. 60/101,888 filed on Sep. 25, 1998, the content of which is relied upon and incorporated herein by reference in its entirety.

FIELD OF THE INVENTION

The present invention relates to the connection of optical fibers and other optical waveguides having different optical properties. More particularly, the present invention relates to an optical fiber having an expanded Mode Field Diameter ("MFD"), and a method of expanding the mode field diameter of optical fibers for subsequent connection to optical fibers having larger mode field diameters.

While the invention is subject to a wide range of connectivity applications, it is especially well suited for the connection of specialty fibers to standard single mode fibers, and will be particularly described in that regard.

BACKGROUND OF THE INVENTION

As the fiber optic industry has matured, specialty fibers such as erbium-doped fibers, dispersion compensating fibers, fibers containing bragg gratings, and long period grating fibers have become increasingly more important in photonic light-wave systems. To provide the necessary performance, these and other specialty fibers need to be connected (or spliced) to other optical fibers or optical devices without exhibiting excessive connection losses, or "splice losses" as they are known to those skilled in the photonic light-wave system art. Invariably, these specialty fibers have mode field diameters that differ in size and other aspects from the mode field diameters of the fibers or devices to which the specialty fibers will be connected. The connection of fibers having such mismatched mode field diameters generally results in excessive splice loss. Standard single mode fiber, the most commonly used fiber today, is no exception.

A number of techniques have been developed over the years to limit the adverse effect of splice loss resulting from mode field diameter mismatch. Heretofore, physical tapering, in-line optical devices, and thermally diffused expanded core ("TEC") methods have been employed in an attempt to adequately match the mode fields of fibers and other devices having different mode field diameter. Physical tapering includes both down-tapering and up-tapering. In-line optical devices include simple optical devices such as lenses, as well as beam expanding fibers combined with micro optical devices such as isolators and modulators. TEC methods include those methods used to expand the mode field diameter via diffusion.

In the down-tapering method, the optical fiber is first fusion-spliced by conventional methods, and the spliced portion of the fiber is thereafter heated so that it can be stretched by pulling. In this way, the softened spliced part develops a tapered shape. The reduced core misalignment due to the tapered shape and the spreading of the mode field diameter in the smaller core diameter fiber typically result in lower splice loss when compared to the original non-tapered splice. However, the tapers fabricated by this method are sensitive to physical perturbations or external refractive-index change because the mode field is no longer tightly bound to the core. In addition, the outer diameter of the tapered fiber changes during the drawing process, thus special fiber plugs are typically required for any connections.

Unlike the down-taper method, the up-taper is fabricated at the stage of drawing a preform and results in an enlarged core. The enlargement of the core results in the expanded mode field diameter. This method is typically applicable for mechanical splicing, bonded splicing, or connectors between an erbium-doped fiber ("EDF") and an ordinary single-mode ("SM") fiber. However, this method also requires special plugs for the connectors, and in addition necessitates a special preform.

Most in-line optical devices utilize lens elements that collimate a beam from a transmitting fiber, or focus the expanded beam onto the core of the receiving fiber. Others combine devices such as laminated polarizer's, microisolator chips, or modulators embedded within the fiber with thermally induced dopant diffusion in certain specialty fibers. Both of these methods, however, are complicated, unstable, and expensive. In addition, for devices utilizing a lens, alignment is a critical concern.

The thermally diffused expanded core method uses the phenomenon of dopant diffusion in a heated fiber to expand the mode field diameter. The general approach to the fusion connection of two fibers with different mode field diameters is to continuously or adiabaticaly vary the core diameters of one or both fibers so that the mode field diameters match at their boundaries. During the process of dopant diffusion, the core diameter becomes large locally, and the relative refractive index difference becomes small locally compared to the ordinary fiber part. The result is a tapered core and thus tapered mode field diameter within the fiber. Accordingly, the thermally diffused expanded core method can be an effective method for locally expanding the fiber mode field diameter. However, as further discussed below, the thermally diffused expanded core methods heretofore known in the art are not effective for certain applications.

Methods for implementing the thermally diffused expanded core technique generally fall into one of two categories. The first is to heat treat the small mode field diameter fiber in a furnace or a gas burner, and then fusion connect the expanded fiber with the larger mode field diameter fiber. The second is to fusion connect the two fibers first, and then apply additional heat to diffuse the fused region. In the first method, furnaces or microbumers are generally employed to provide the heat for the diffusion. Due to the temperature limits of most furnaces, the process typically takes several hours to complete, and requires the application of a carbon coating once the primary coating has been stripped from the fiber.

Application of a carbon coating is expensive and time consuming, but is necessary to reduce the heat exposure time required to properly diffuse the dopant. Even though temperatures within the furnace are not generally considered extreme, long periods of exposure to a gas flame tends to make the fiber brittle. For this reason, open-ended furnaces having a maximum temperature of approximately 1300° are employed to treat the fiber. Using such an open-ended furnace generally requires exposing a fiber having a 1% delta for more than ten (10) hours. Because of the low temperature gradient in an open-ended furnace, the fiber core expands slowly along at least 200 mm of the fiber length before reaching maximum diameter. As a result, the long heattreated section of the fiber has relatively low mechanical strength and requires extra protection and packaging before it can be effectively used in a photonic component. Moreover, because of the large size of the furnace and microburner systems, the first method is not readily available for use in the field where many of the fiber splices must be made.

The second method works well only when the diffusion coefficient of the core dopant in the smaller mode field diameter fiber is much greater than that of the larger mode field diameter fiber. A small mode field diameter fiber doped with erbium is a typical example. For high-delta ("HD") and single-mode fibers, both of which are doped with slowly diffusing germanium, the core discontinuity cannot be completely eliminated using this method. When the splice is fabricated using an arc fusion discharge, the resulting splice loss is typically around 0.3 dB, which is still unacceptably high since there are typically numerous fusion connections of this kind in an optical network. Accordingly, adiabatic coupling cannot be achieved by merely heating the fused region after connection.

In view of the foregoing, there is a need for an optical fiber having an expanded mode field diameter that matches the larger mode field diameter of an optical fiber or other optical waveguide device of a photonic component (or other photonic light-wave systems) so that the fibers can be consistently connected with minimal splice loss. In addition, there exists a need for a method of expanding the mode field diameter of an optical fiber that is easily repeatable, consistent in application, consumes limited time and resources, results in a compact mode field diameter expansion region with respect to the length of the optical fiber, produces minimal splice loss when the expanded mode field diameter fiber is connected to another fiber, and is capable of being performed in the field.

SUMMARY OF THE INVENTION

Accordingly, the present invention is directed to an optical fiber having an expanded mode field diameter, and a method of expanding the mode field diameter of an optical fiber which obviates the need for prolonged exposure to heat in a furnace in order to facilitate core diffusion within the fiber, and thus an expanded mode field diameter. One advantage of such an expanded mode field diameter optical fiber is that it has a short expanded mode field region, which is easier to protect after splicing, and provides sufficient strength for the fiber. When an expanded mode field diameter optical fiber of the present invention is connected to a standard single mode optical fiber, the short expanded mode field region enables the photonic sub-assembly formed thereby to have reduced package size. Accordingly, sub-assembly costs are reduced, as are sub-assembly repair times.

An advantage of the method of expanding the mode field diameter of an optical fiber of the present invention is the short duration heat treatment. The short duration enables those skilled in the art to quickly determine the minimum splice loss achievable for various combinations of fiber splices. Likewise, the target loss can be readily determined for various fiber combinations. In contrast, those methods requiring several hours of heat treatment will consume an entire day or longer before being able to determine whether a single splice provides an acceptable splice loss. Moreover, the method of the present invention requires no special treatment of the fiber pigtail due to its short length.

To achieve these and other advantages, an adiabatic taper is formed in an optical fiber by aligning and abutting a cleaved end of a small mode field diameter optical fiber with a cleaved end of a large mode field diameter optical fiber adjacent a heat source to form a splice seam. The splice seam is offset a predetermined distance from the center of the heat region produced by the heat source and heat is applied in the heat region to splice the fibers and expand the mode field diameters while the decrease in splice loss is monitored. When the observed splice loss is at or sufficiently close to a target loss, the application of heat is terminated and the small mode field diameter optical fiber is cleaved at the point where heat from the heat source is delivered to the small mode field diameter optical fiber by the center of the heat region.

In another aspect, the invention includes an optical fiber having a core bounded by a cladding, and a cleaved end having an adiabatic taper less than 1 cm in length formed therein. The cleaved end is adapted to be spliced to a second optical fiber having a larger mode field diameter with less than a 0.1 dB splice loss.

In yet another aspect, the invention includes a component for use with a wavelength division multiplexed system ("WDM") system. The component includes an input optical fiber span having a large mode field diameter and a small mode field diameter optical fiber having at least one fiber Bragg grating and an expanded mode field diameter portion. The expanded mode field diameter portion of the small mode field diameter optical fiber is fusion spliced to the input optical fiber span in accordance with the above-described aspects of the present invention.

Additional features and advantages of the invention will be set forth in the detailed description, which follows, and in part will be apparent from the description, or may be learned by practice of the invention. It will be understood by those skilled in the art that both the foregoing general description and the following detailed description are exemplary and explanatory in nature and are intended to provide further explanation of the invention as claimed.

The accompanying drawings are included to provide a further understanding of the invention, and are incorporated in and constitute a part of this specification. The drawings illustrate several embodiments of the invention, and together with the description serve to explain the principles of the invention.

DETAILED DESCRIPTION OF THE PREFERRED EMBODIMENTS

In the rapidly growing field of photonic light-wave systems, specialty fibers such as erbium-doped fiber, dispersion compensating fiber, fiber Bragg grating fiber, and long period grating fiber are playing an increasingly important roll. Unfortunately, the inherent properties of these and other fibers have made their use in photonic light-wave systems very difficult. Specifically, mode field diameter mismatch between the specialty fibers and standard fibers or other optical waveguide components has made fiber connection, or splicing, in these systems a difficult task.

Fiber for fiber Bragg grating imprinting, in particular, requires high germanium dopant concentrations in the fiber core, which results in fibers having small mode field diameters. In these fibers, the Bragg grating couples the core mode at slightly shorter wavelengths than the Bragg wavelength to backward propagating cladding mode. Because the window between the Bragg wavelength and the on set of cladding mode absorption limits the total number of wave division multiplexed ("WDM") channels that the fiber Bragg grating device can be used for, there is an incentive to increase the size of the window between the Bragg wavelength and the cladding mode onset. From the phase matching perspective, the window can be widened by increasing the delta, which is the relative difference between the refractive index of the core and that of the cladding. In practice, a fiber Bragg grating written on a SMF-28™, a single mode optical waveguide fiber sold by Corning Incorporated of Corning, N.Y., which has a delta of 0.36% exhibits a cladding mode onset window of 2 nm, while in the 2% high delta fiber, the window is increased to 7 nm. Accordingly, it is desirable to employ high delta fibers in WDM systems and other components.

In accordance with the present invention, a highly localized high temperature heat source, such as an arc fusion splicer, a tungsten filament, or a $CO_2$ laser is used to expand the mode field diameter and thus form the adiabatic taper. For those skilled in the art, it is known that the arc discharge temperature of an arc fusion splicer depends on not only the discharge current, but also the condition of the electrodes. Therefore, mode field diameter expansion is not adequately controlled by measuring arc time against current. Additionally, because of the narrow arc region provided by an arc fusion splicer, a precise cleavage with position accuracy of 10 μm is required in order to consistently obtain the same expanded mode field at the fiber end. These shortcomings have previously precluded the use of arc fusion splicers for mode field diameter expansion prior to fusion connection.

Figure 1:
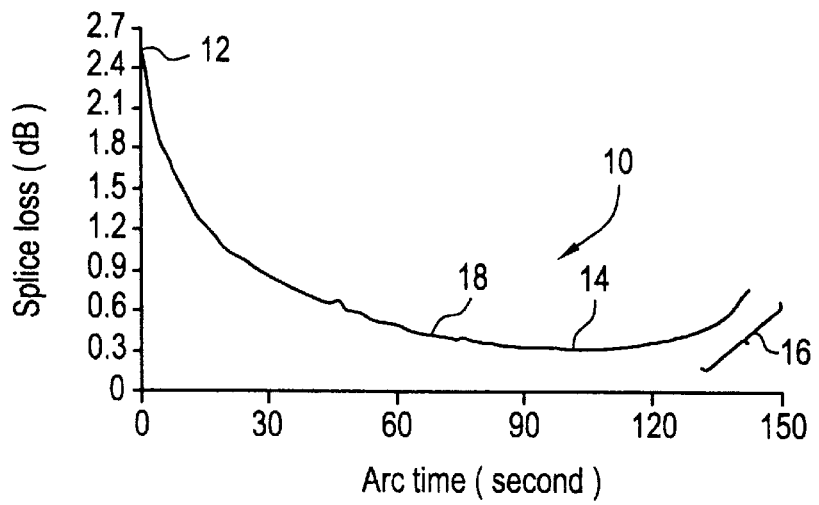
FIG. 1 is a graph showing splice loss in relation to arc time during mode field diameter expansion in accordance with the present invention.

Reference will now be made in detail to an exemplary embodiment of the invention, an example of which is illustrated in the accompanying drawings. FIG. 1 graphically illustrates splice loss over arc time during the fusion splicing of a germanium-doped optical fiber having a 2% delta, and a standard single mode fiber. Exemplary of standard single mode fiber is SMF-28™ manufactured by Corning Incorporated. The initial arc which fuses the two fibers having different sized mode field diameters is indicated by reference character 12. As additional current is supplied to the fibers, the slope of curve 10 decreases. During this time the splice loss is decreasing as germanium from the core of the high delta fiber is diffused into the cladding region of the high delta fiber. As shown by curve 10, this continues until the minimum splice loss achievable for these two fibers is reached as indicated by reference character 14 in FIG. 1. In this case a minimum splice loss of 0.33 dB is achieved in approximately 105 seconds. This relatively high minimum splice loss is due to the fact that the mode field diameters of the HD fiber and the SM fiber do not match at the splice seam. Thereafter, the splice loss increases as additional current is applied to the heat region (indicated by reference character 16). During this time period, over expansion of the cores of the fiber has occurred.

Due to the high tolerances used during fiber production, the splice loss versus arc time curve for the connection of any germanium-doped 2% delta fiber and any standard single mode SMF-28™ manufactured by Corning Incorporated will be substantially similar to that shown as curve 10 in FIG. 1. Accordingly, the minimum splice loss of approximately 0.33 dB will result. Although the time necessary to reach this minimum loss will vary due to such variables as the condition of the electrodes. The minimum loss itself can be used to determine a target splice loss for this fiber combination.

The target loss is always slightly larger than the minimum splice loss achievable because the core of the germanium doped high delta fiber expands more at the center of the arc than at the fusion boundary. Accordingly, the target loss can be determined experimentally by several iterations. Through such experimentation, it has been determined that a target loss of 0.45 dB is optimal for the mode field diameter expansion of the present invention when a germanium doped 2% delta fiber is supplied and connected to a standard single mode optical fiber, exemplary of which is SMF-28™ manufactured by Corning Incorporated. Stated differently, when the splice loss at the fusion boundary reaches 0.45 dB as indicated by reference character 18 in FIG. 1, the mode field diameter of the germanium-doped 2% delta fiber will be optimally expanded to match the mode field diameter of a standardsingle mode optical fiber, exemplary of which is SMF-28™ manufactured by Corning Incorporated. Accordingly, the method of the present invention can be carried out as set forth below.

Figure 2:
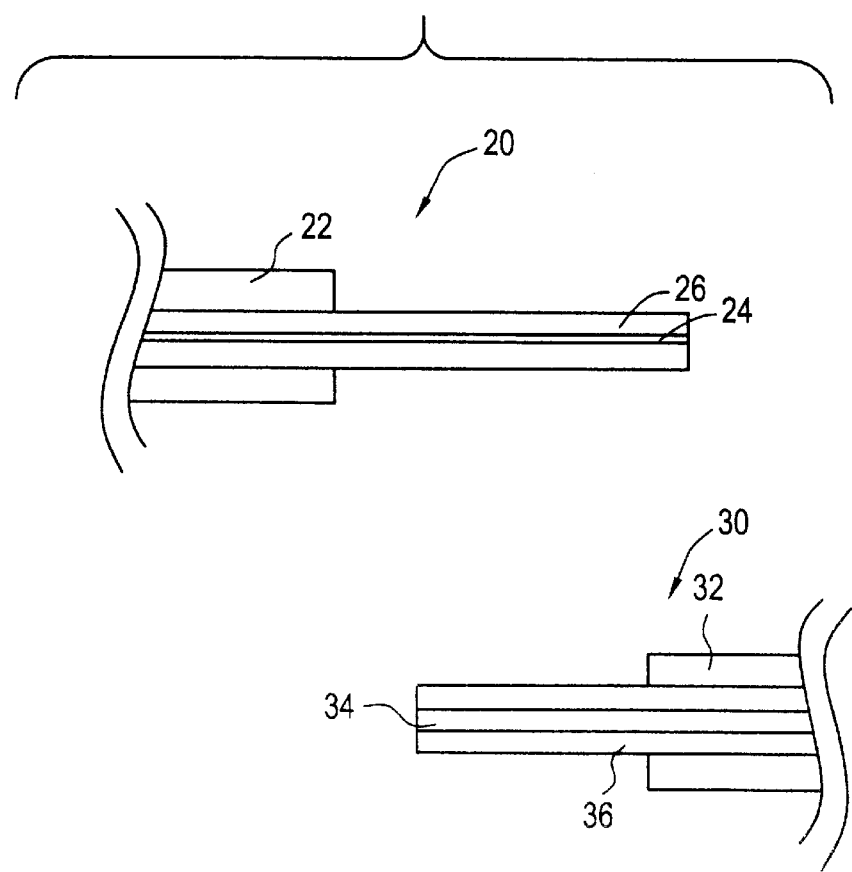
FIG. 2 is an enlarged partial cross sectional view of the ends a small mode field diameter optical fiber and a large mode field diameter optical fiber, each shown stripped of its primary coating in accordance with the present invention.
Figure 3:
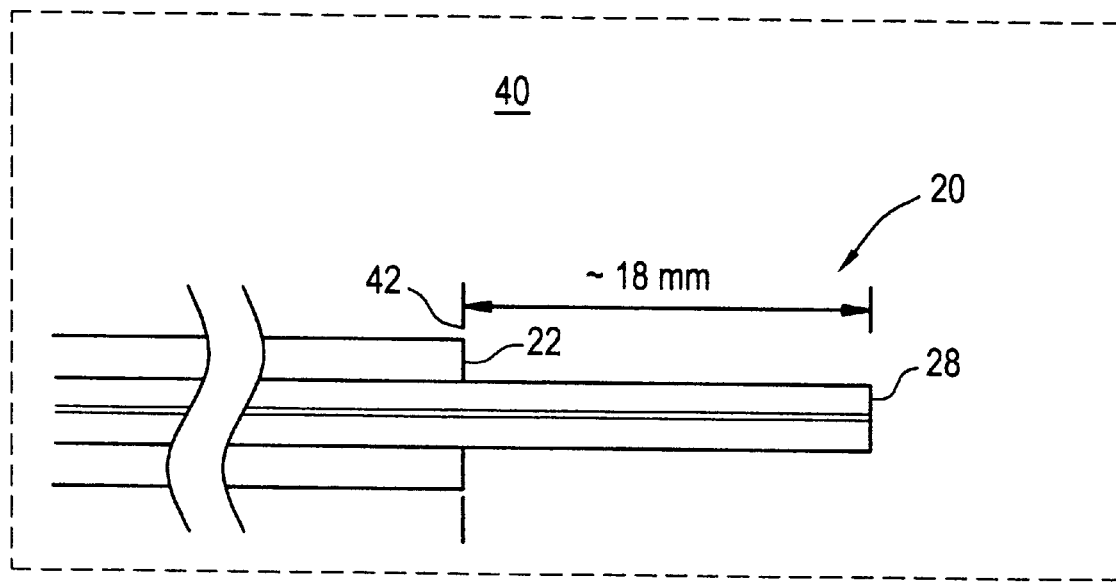
FIG. 3 is an enlarged partial cross sectional view of a small mode field diameter optical fiber shown within a schematically depicted cleaver in accordance with the present invention.

The preferred embodiment of the method of expanding the mode field diameter of an optical fiber of the present invention is illustrated in FIGS. 2–6. As shown in FIG. 2, a germanium doped 2% delta fiber 20 is stripped of its primary coating 22 over a portion of its length exposing a small diameter core 24 bounded by a cladding 26. Likewise, a standard single mode SMF 28 optical fiber 30 is also stripped of its primary coating 32 over a portion of its length to expose a larger diameter core 34 bounded by a cladding 36. High delta fiber 20 is placed in a conventional cleaver 40, such as, for example, a York EFC 11 ultra-sonic cleaver, such that the end of the primary coating 22 (or other landmark) is aligned with a line mark 42 or other reference point on schematically depicted cleaver 40 as shown in FIG. 3. To assist with this alignment, it is preferred that a low power microscope (30×) is used. When properly seated within cleaver 40, the distance between line mark 42, and thus the end of coating 22, and the cleave blade (not shown)

is approximately 18 mm. High delta fiber 20 is cleaved to provide a precise cut 28 on the uncoated end of high delta fiber 20. Although not shown in the drawing figures, large mode field diameter fiber 30 is also placed in a cleaver 40 and cleaved at uncoated end 38.

Figure 4:
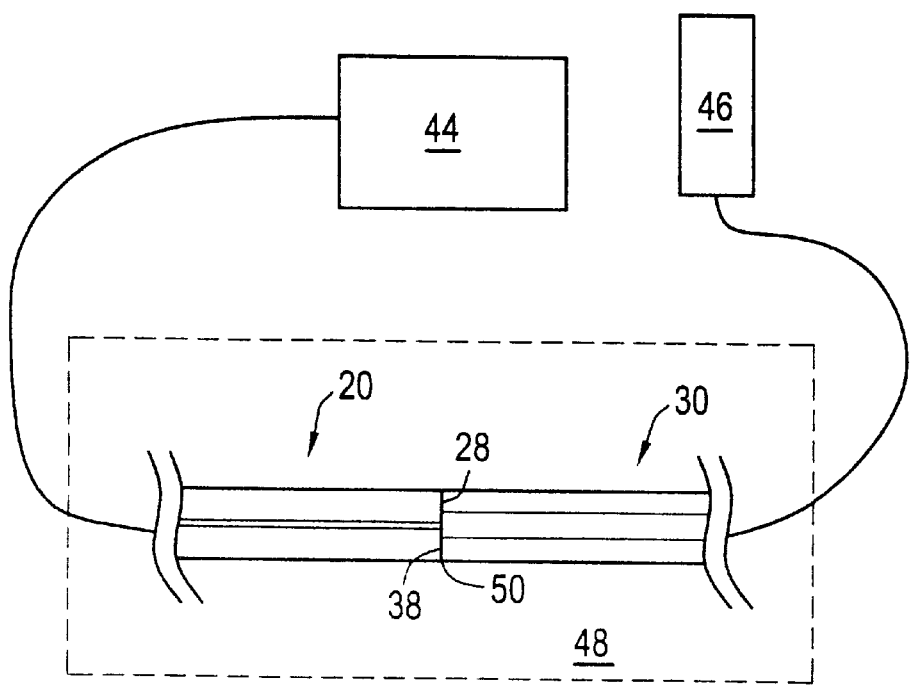
FIG. 4 is an enlarged partial cross sectional view of a small mode field diameter optical fiber and a large mode field diameter optical fiber shown schematically connected to a power meter and a laser source, respectively, and forming a splice seam within a schematically depicted fusion splicer in accordance with the present invention.

As shown schematically in FIG. 4, the uncoated ends of small mode field diameter fiber 20 and large mode field diameter fiber 30 are optically connected to a power meter 44 such as, for example, a Hewlett Packard model HP8153A multimeter, and a laser source 46, respectively, in order to monitor the connection loss during splicing. Due to optical reciprocity, the connection loss or splice loss, is independent of the transmission direction of the laser beam delivered by laser 46. Accordingly, laser 46 can be connected to small mode field diameter fiber 20 and power meter 44 connected to large mode field diameter fiber 30 without effecting the method of the present invention. As further shown in FIG. 4, cleaved ends 28 and 38 of small mode field diameter fiber 20 and large mode field diameter 30 are positioned within a fusion splicer 48, such as, for example, an arc fusion splicer exemplary of which is model no. FSU 975 manufactured by Ericsson Incorporated. Fusion splicer 48 is programmed to bring ends 28 and 38 together so that they abut one another and are in proper alignment.

Figure 5:
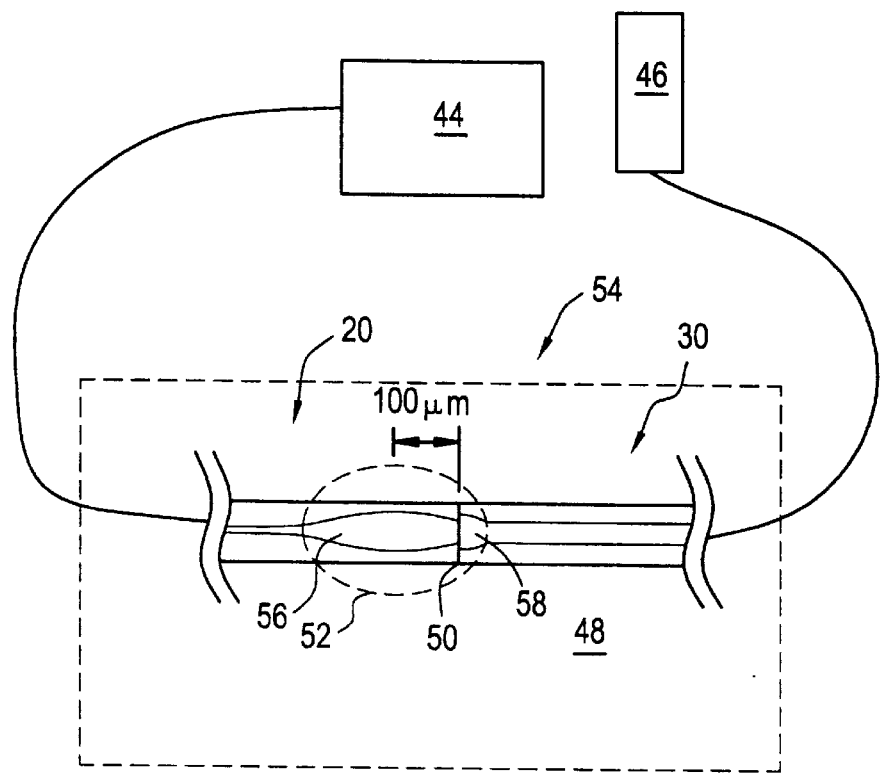
FIG. 5 is an enlarged partial cross sectional view showing the expansion of the mode field diameters of the small mode field diameter optical fiber and the large mode field diameter optical fiber of FIG. 4 in accordance with the present invention.

Another function of fusion splicer 48 is to offset the fiber splice seam 50 a known distance, preferably 100 $\mu$m, as shown in FIG. 5, so that a larger portion of the small mode field diameter fiber lies in arc region or heat region 52 than that of large mode field diameter fiber 30. It will be understood by those skilled in the art that the arc region could be offset rather than the splice seam 50. The objective is to apply the highest intensity heat to small mode field diameter fiber 20 rather than splice seam 50. Fibers 20 and 30 are initially fused at splice seam 50 by delivery of an initial arc discharge current of approximately 15.5 mA for an arc time of approximately 2 seconds. While laser light from laser 46 is passed through fibers 30 and 20, additional arc is intermittently applied over arc region 52 to diffuse dopant(s), in this case germanium, within the core of small mode field diameter fiber 20 residing in arc region 52. Because dopant(s) also reside in the core of large mode field diameter fiber 30, expansion, albeit less pervasive, of the core of large mode field diameter fiber 30 residing within arc region 52 is also expanded.

In one example that has proven suitable, arc current is repeatedly applied for periods of ten seconds while the decrease of connection loss is monitored by power meter 44. When the splice loss measured by power meter 44 is reduced to below 0.8 dB, the arc time is gradually reduced for more precise control of the loss. Shorter arc times in the range of approximately 2 to 6 seconds are selectively applied until the splice loss measured at power meter 44 is reduced to a target loss of approximately 0.45 dB. As discussed above, the target loss is slightly higher than the minimum achievable splice loss as illustrated on the splice loss curve 10 at reference character 14 of FIG. 1. The result as illustrated in FIG. 5 is a fused fiber 54 having a small mode field diameter fiber 20 portion which includes an expanded mode field diameter portion 56, and a large mode field diameter fiber 30 portion which includes an expanded mode field diameter portion 58. Depending on the condition of the electrodes, the total arc time necessary for this phase of the process is approximately one to two minutes.

Figure 6:
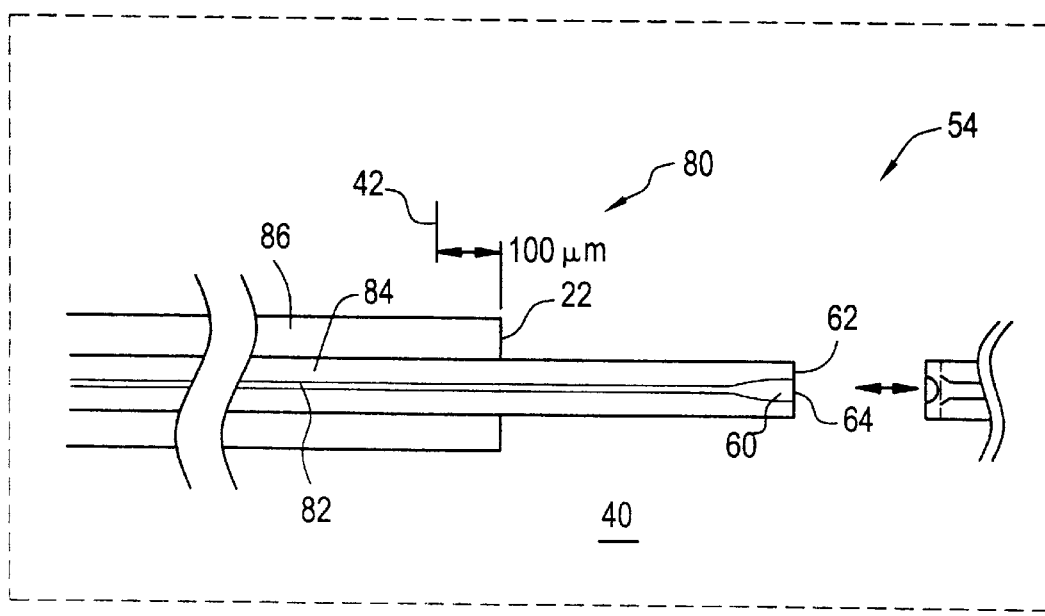
FIG. 6 is an enlarged partial cross sectional view of an expanded mode field diameter optical fiber of the present invention shown within a schematically depicted cleaver.

Referring to FIG. 6, fused fiber 54 is positioned within cleaver 40, and with the assistance of a 30x microscope, end of coating 22 (or other landmark) is offset the same distance splice seam 50 was offset in fusion splicer 48, preferably 100 $\mu$m, toward the cleave blade (not shown). Fused fiber 54 is then cleaved resulting in an expanded mode field diameter fiber 80 having an adiabatic taper 60 at the second cleaved end 62. Because fused fiber 54 was offset during this cleaving step, the cleave is made at the point in expanded mode field region 56 exposed to the highest temperature heat delivered by the center of arc region 52. Thus, at second cleave 62, mode field diameter 64 is optimized for connection to a standard single mode SMF 28 fiber.

Figure 7:
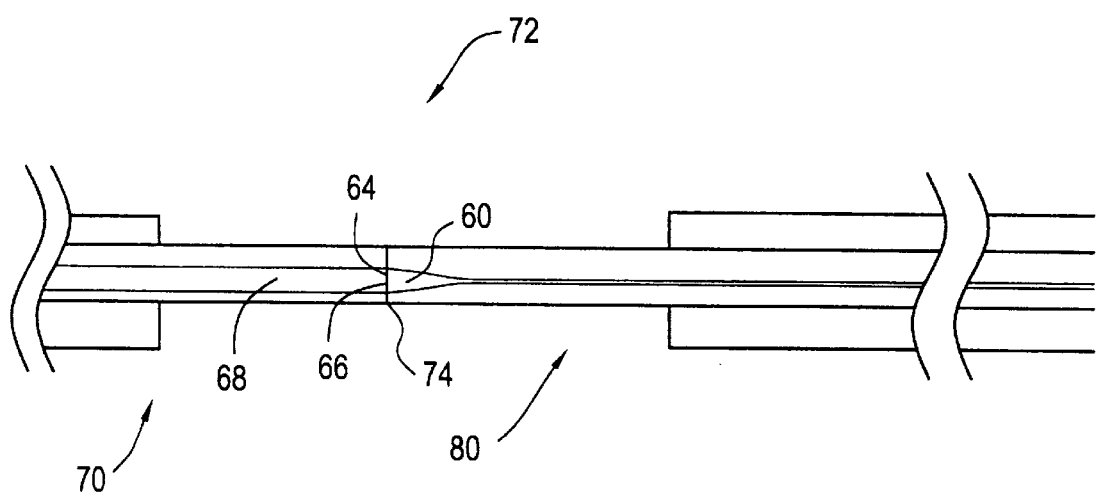
FIG. 7 is an enlarged partial cross sectional view of an expanded mode field diameter optical fiber shown spliced to a large mode field diameter optical fiber to form an optical fiber component in accordance with the present invention.

Referring now to another aspect of the present invention, expanded mode field diameter fiber 80 of the present invention is also depicted in FIG. 6. Expanded mode field diameter fiber 80 has a small diameter core 82 bounded by cladding 84 having a higher refractive index than core 82. Optical fiber 80 is preferably a 2% delta high delta optical fiber containing germanium in core 82. At least a portion of the fiber 80 has a primary coating 86, while the uncoated portion has an expanded core region or adiabatic taper 60 at its cleaved end 62. The adiabatic taper occupies less than one (1) cm of the length of the uncoated portion of fiber 80, and is preferably one (1) mm or less in length. Although fiber 80 is doped with germanium in the preferred embodiment, it will be understood by those skilled in the art that optical fibers having cores containing other dopants, such as erbium, boron, fluorine, or other dopant materials, can also form the fiber of the present invention. The mode field diameter 64 at cleaved end 62 of fiber 80 is optimized for connection to a standard single mode optical fiber 70 as shown in FIG. 7 to form an optical fiber component 72. Although not shown in the drawing figure, the splice 74 and uncoated portions of fibers 70 and 80 can be packaged and protected with a ultra-violet cured protection sleeve and splice compound, or other protective sleeve known in the art. Typical splice loss values for optical component 72 formed using fiber 80 of the present invention are typically less than 0.1 dB and have been recorded at less than 0.05 dB The 1 mm long adiabatic taper 60 within optical fiber 80 of the present invention, is due in large part to the narrow high temperature region produced by the arc fusion splicer used to diffuse the germanium in the core 82 of fiber 80, as well as the novel offset step described in detail above. Other advantages provided by the use of an arc fusion splicer is that the expansion of the mode field diameter is adiabatic since the arc discharge has a smooth temperature profile. Additionally, the adiabatic region 60 is generally shorter than the adiabatic region of other fibers expanded by other methods known in the art by at least two orders of magnitudes. The short adiabatic region of the present invention also enables the uncoated portion of fiber 80 to be much shorter (approximately 18 mm) than the uncoated portions of fibers having expanded mode field diameters produced by other methods known in the art. Accordingly, there is less polarization mode dispersion (PMD) experienced in photonic systems incorporating expanded mode field diameter optical fiber 80 of the present invention. Moreover, there is no special treatment of the uncoated portion of optical fiber 80 prior to heat treatment, and the overall strength of the splice, and therefore the component, is significantly greater than splices made with other thermally diffused expanded core methods known in the art. Mechanical tensile strength or pull test results for splices made in accordance with the present invention have measured greater than 50 kpsi after packaging, which is comparable to a single mode fiber to single mode fiber mechanical pull test result. In addition, temperature cycling for a splice made in accordance with the present invention has been rated for −20° C. to 80° C., again comparable to a single mode fiber to single mode fiber rating.

In yet another aspect of the present invention, and as shown in FIG. 7, expanded mode field diameter fiber 80 having adiabatic taper 60 can be spliced to a standard single mode SMF 28 fiber 70 to form a component 72 for a photonic light-wave system or other device as briefly described above. Using a single mode fiber to single mode fiber fusion program, optimized mode field diameter 64 of adiabatic taper 60 is aligned with mode field diameter 66 of core 68 of standard single mode SMF 28 fiber 70 and fused to form splice 74. Due to the well-matched mode field diameters at splice 74, the splice loss of component 72 is less than 0.1 dB.

Figure 8:
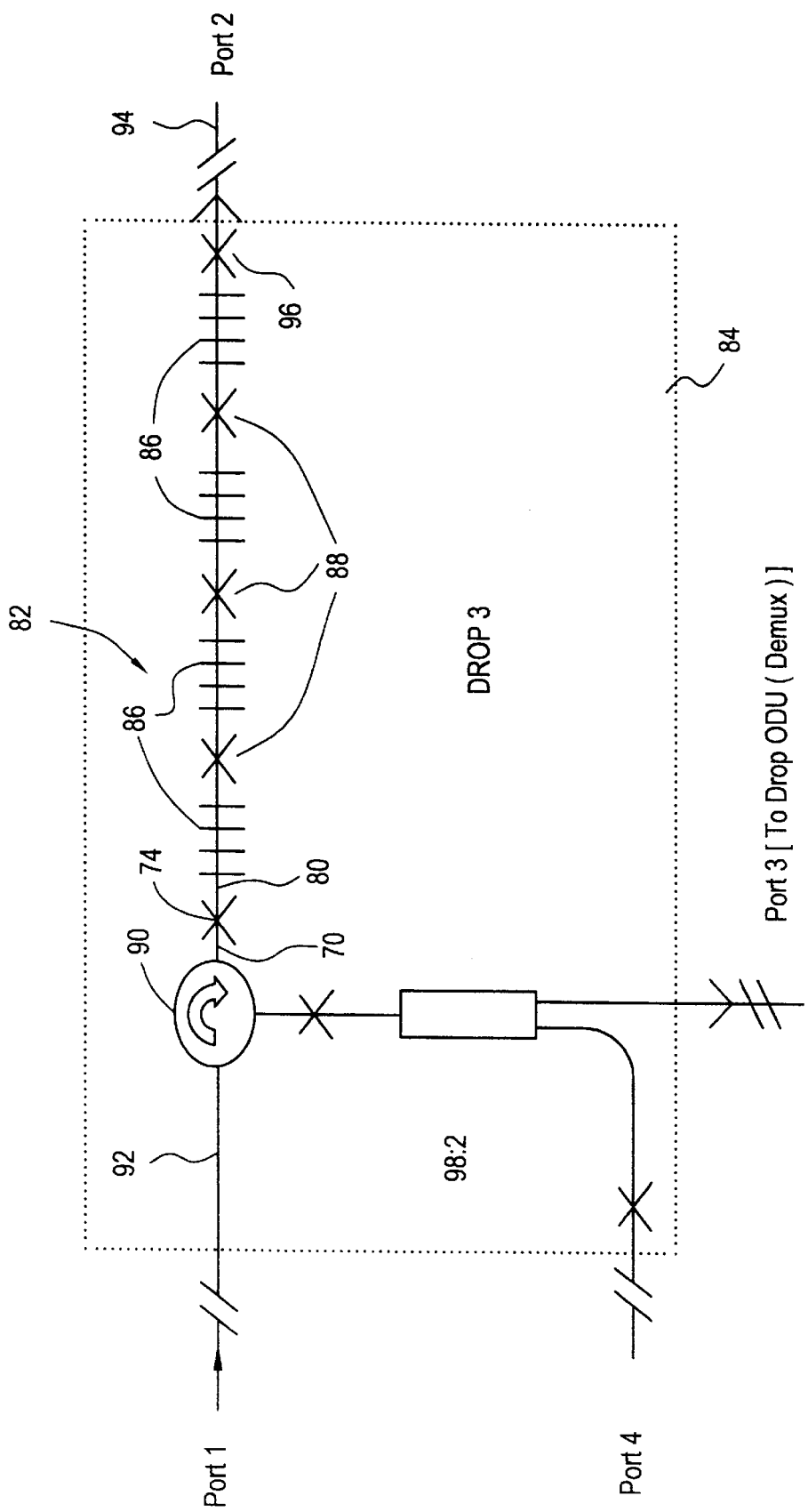
FIG. 8 is a schematic view of a fixed wavelength drop module incorporating a component in accordance with the present invention.

One embodiment of such a component is depicted in FIG. 8. Component 82 is shown forming a part of a larger drop module 84 used in connection with a WDM system. It will be understood by those skilled in the art that component 82 can also form part of an add module for a WDM system, and can also be used in other photonic light-wave systems. Component 82 as shown in FIG. 8 is formed by fusion splicing expanded mode field diameter fiber 80 to a standard single mode exemplary of which is SMF-28™ single mode optical fiber manufactured by Corning Incorporated 70 to form splice 74. Expanded mode field diameter fiber 80 includes a plurality of concatenated fiber Bragg gratings 86 connected via a plurality of fusion splices 88. Fiber Bragg gratings 86 are each imprinted on high delta fibers, thus the fusion splices 88 are made between fibers having the same mode field diameter. Accordingly, fusion splices 88 can be made by those methods currently known in the art. As further shown in FIG. 8, standard single mode fiber 70 forms the pigtail of an optical circulator 90 which in turn is connected to an input optical fiber span 92. Output optical fiber span 94 is also a standard single mode SMF 28 fiber and thus is connected to the distal end of expanded mode field diameter fiber 80 with a fusion splice 96 made in accordance with the present invention exemplary of suitable single mode fiber is SMF-28™ manufactured by Corning Incorporated. Together, fiber Bragg gratings 86 and optical circulator 90 cooperate to enable a WDM system to drop selected channels corresponding to the gratings 86. In addition to performing this function, component 82 provides a distinct advantage of other components known in the art as it reduces the overall insertion loss of the assembly.

In yet another embodiment, expanded mode field diameter fiber 80 includes a plurality of concatenated WDM add/drop filters (not shown) and is fusion spliced to a standard single mode optical fiber. The filters are thus directly connected to a single mode fiber span without the use of optical circulators.

It will be apparent to those skilled in the art that various modifications and variations can be made in the optical fiber having an expanded mode field diameter and method of expanding the mode field diameter of an optical fiber of the present invention without departing from the spirit or scope of the invention. Thus, it is intended that the present invention cover the modifications and variations of this invention provided they come within the spirit and scope of the appended claims and their equivalents. In addition, the corresponding structures, materials, acts and equivalents of all means or step plus function elements in the claims below are intended to include any structure, material, or acts for performing the function in combination with other claimed elements as specifically claimed herein.

What is claimed is:

1. An optical fiber having an MFD and being adapted to be connected to a second optical fiber having a larger MFD, said fiber comprising:

a cladding;

a core bounded by said cladding; and a cleaved end having an adiabatic taper less than 1 cm in length formed therein, said cleaved end being adapted to be spliced to the second optical fiber with less than a 0.1 dB splice loss, wherein said adiabatic taper is formed by heating said fiber for less than three minutes.

2. The optical fiber as claimed in claim 1 wherein said adiabatic taper is less than 2 mm in length.

3. The optical fiber as claimed in claim 1 wherein said adiabatic taper is less than 1 mm in length.

4. The optical fiber as claimed in claim 1 wherein said adiabatic taper is formed using an arc fusion splicer.

5. The optical fiber as claimed in claim 1 wherein said adiabatic taper is formed using a $CO_2$ laser.

6. The optical fiber as claimed in claim 1 wherein said adiabatic taper is formed using a tungsten filament heat source.

7. The optical fiber as claimed in claim 1 wherein said core includes germanium.

8. The optical fiber as claimed in claim 7 wherein the delta is about 2%.

9. The optical fiber as claimed in claim 1 further comprising a delta greater than 1%.

10. The optical fiber as claimed in claim 1 further comprising a delta greater than 2%.

11. A method of forming an adiabatic taper in an optical fiber, said method comprising the steps of:

aligning and abutting a cleaved end of a first optical fiber having a small MFD and a cleaved end of a second optical fiber having a large MFD adjacent a heat source to form a splice seam;

offsetting said splice seam a predetermined distance from the center of the heat region of said heat source;

applying heat in the heat region to splice the fibers and expand the MFDs;

monitoring the decrease in splice loss during the heating step;

terminating the application of heat when the splice loss is at or sufficiently close to a target loss;

cleaving said first optical fiber where heat from said heat source is delivered to said first optical fiber by the center of the heat region wherein the step of applying heat is less than three minutes in duration, thereby diffusing dopant from the core of the first and second optical fibers into the respective claddings of the first and second optical fibers.

12. The method as claimed in claim 11 wherein the fiber has a primary coating and wherein the step of aligning and abutting further comprises the step of removing the primary coating from at least a portion of the first optical fiber and the second optical fiber.

13. The method as claimed in claim 11 wherein said heat source is an arc fusion splicer having electrodes, and wherein the step of applying heat comprises the step of intermittently applying an arc across the electrodes.

14. The method as claimed in claim 11 wherein said first optical fiber has a delta greater than 1% and wherein the step of applying heat comprises the step of optimizing the MFD of the first optical fiber to match the MFD of the second optical fiber.

15. The method as claimed in claim 11 further comprising the step of fusion splicing the cleaved first optical fiber to another optical fiber, and wherein the resulting splice loss is less than 0.1 db.

16. The method as claimed in claim 11 wherein the core of the first optical fiber includes erbium and the second optical fiber is a single mode optical fiber, and wherein the step of applying heat comprises the step of diffusing the erbium into the cladding of the first optical fiber.

17. The method as claimed in claim 11 wherein the core of the first optical fiber includes erbium and the second optical fiber is a single mode optical fiber having a germainia doped core, and wherein the step of applying heat comprises the step of diffusing the erbium into the cladding of said first optical fiber and diffusing the germaina into the cladding of said single mode optical fiber.

18. An optical fiber having a mode field diameter and being adapted for connection to a second optical fiber having a larger mode field diameter, said optical fiber comprising:

a cladding;

a core bounded by said cladding, said core consisting essentially of silica and germanium; and a cleaved end having an adiabatic taper less than 1 cm in length formed therein, said cleaved end being adapted for splicing to the second optical fiber with less than a 0.1 dB splice loss, wherein said adiabatic taper is formed by heating said optical fiber for less than three minutes, thereby diffusing germanium from said core into said cladding.

* * * * *